(12) United States Patent
Martini et al.

(10) Patent No.: US 7,751,399 B2
(45) Date of Patent: Jul. 6, 2010

(54) SCALABLE VIRTUAL PRIVATE LOCAL AREA NETWORK SERVICE

(75) Inventors: Luca Martini, Lakewood, CO (US); Ali Sajassi, San Ramon, CA (US); William Mark Townsley, Paris (FR); Richard Mandfred Pruss, Tewantin (AU)

(73) Assignee: Cisco Technology, Inc., San Jose, CA (US)

( * ) Notice: Subject to any disclaimer, the term of this patent is extended or adjusted under 35 U.S.C. 154(b) by 372 days.

(21) Appl. No.: 11/834,663

(22) Filed: Aug. 6, 2007

(65) Prior Publication Data

US 2009/0041038 A1    Feb. 12, 2009

(51) Int. Cl.
*H04L 12/28* (2006.01)
(52) U.S. Cl. ............ 370/392; 370/395.5; 370/401
(58) Field of Classification Search ........ 370/254, 370/255, 389, 392, 395.5, 400, 401, 469
See application file for complete search history.

(56) References Cited

U.S. PATENT DOCUMENTS

| 7,260,097 B2 * | 8/2007 | Casey | 370/392 |
| 7,339,929 B2 * | 3/2008 | Zelig et al. | 370/390 |
| 2004/0151180 A1 * | 8/2004 | Hu et al. | 370/392 |
| 2004/0213228 A1 * | 10/2004 | Tingle et al. | 370/389 |
| 2006/0098654 A1 * | 5/2006 | Tingle et al. | 370/389 |
| 2006/0221950 A1 * | 10/2006 | Heer | 370/389 |
| 2007/0008982 A1 * | 1/2007 | Voit et al. | 370/401 |
| 2007/0076709 A1 * | 4/2007 | Mattson et al. | 370/389 |
| 2007/0116045 A1 * | 5/2007 | Mohan et al. | 370/466 |

OTHER PUBLICATIONS

Cowburn, Ian, Ed., MAC Hiding in an H-VPLS Environment, /proceedings/06nov/IDs/draft-cowburn-l2vpn-vpls-ldp-mac-hiding-01.txt, Sep. 1, 2006, Publisher: Internet Engineering Task Force, Internet-Drafts, Published in: Internet, www3.ietf.org.

Lasserre, Marc and Kompella, Vach, Eds., Virtual Private LAN Services Using LDP, /html/draft-ietf-l2vpn-vpls-ldp-09, Jun. 1, 2006, Publisher: Internet Engineering Task Force, Internet-Drafts, Published in: Internet tools.ietf.org.

* cited by examiner

*Primary Examiner*—Hong Cho
(74) *Attorney, Agent, or Firm*—Patent Capital Group

(57) ABSTRACT

In one embodiment, a method includes receiving a data link layer packet, such as an Ethernet packet, at a local provider edge node in a provider network from a first customer edge node of multiple customer edge nodes connected directly to the local provider edge node. A tunnel data packet for a particular tunneling protocol is generated. The tunnel data packet includes tunnel data that indicates tunnel termination at a different provider edge in the provider network. The tunnel data packet also includes customer identifier data and the data link layer packet. The customer identifier data uniquely indicates a customer associated with the first customer edge node. The tunnel data packet is sent over the provider network.

27 Claims, 6 Drawing Sheets

SCALABLE VIRTUAL PRIVATE LOCAL AREA NETWORK SERVICE

BACKGROUND OF THE INVENTION

1. Field of the Invention

The present invention relates to extending local area network (LAN) service over a provider network using a virtual private LAN service (VPLS).

2. Description of the Related Art

Networks of general purpose computer systems and specialized devices connected by external communication links are well known and widely used in commerce. The networks often include one or more network devices that facilitate the passage of information between the computer systems. A network node is a network device or computer or specialized device connected by the communication links. An end node is a node that is configured to originate or terminate communications over the network. An intermediate network node facilitates the passage of data between end nodes.

Information is exchanged between network nodes according to one or more of many well known, new or still developing protocols. In this context, a "protocol" consists of a set of rules defining how the nodes interact with each other based on information sent over the communication links.

A local area network (LAN) comprises multiple end nodes that share a communication link without an intervening intermediate network node. Such a communication link is called a network segment. The nodes on a network segment exchange data packets formatted according to a data link layer protocol such as the Ethernet protocol. A destination or source for a data packet on a network segment is indicated by a Media Access Control (MAC) identifier that is unique among all network devices. A virtual LAN (VLAN) includes one or more intermediate network nodes that forward data packets from one segment to another segment based on an identifier called a tag that indicates segments on the same VLAN. The tag is included in the Ethernet protocol header.

Different LANs and VLANs, administered by different entities and using different communication links, communicate with each other using an internetworking layer protocol, such as the Internet Protocol (IP) or the Multiple-Protocol Label Switching protocol (MPLS).

A virtual private network VPN is made up of one or more LANs administered by one entity, called herein a customer, connected by tunnels across one or more wide area networks administered by one or more different entities, each called a service provider (SP). In network parlance, a tunnel for data is simply a protocol that encapsulates that data. A tunnel is provided by a tunneling protocol, like MPLS, that encapsulates the data link layer protocol data packets and ensures their delivery from one site of the customer to a another site of the same customer. The multiple customer sites can be connected by a full mesh of tunnels connecting each of the customer's LANs and VLANs to every other LAN and VLAN of the same customer. Such a mesh of tunnels is called a virtual private LAN service (VPLS).

In current VPLS approaches, each tunnel is configured to take only the traffic from a single customer. Traffic from other customers is transported across the wide area network using different tunnels. Each tunnel must be configured to indicate a particular interface to the customer equipment at each end, and the type of data to be packed in the tunnel so that it can be correctly unpacked and delivered at the far end. The tunnel is established and disestablished using a tunneling control protocol, such as the label distribution protocol (LDP) for MPLS tunnels. The tunneling control protocol is determined during configuration. Each of the configured point to point tunnels is called a pseudowire (PW).

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
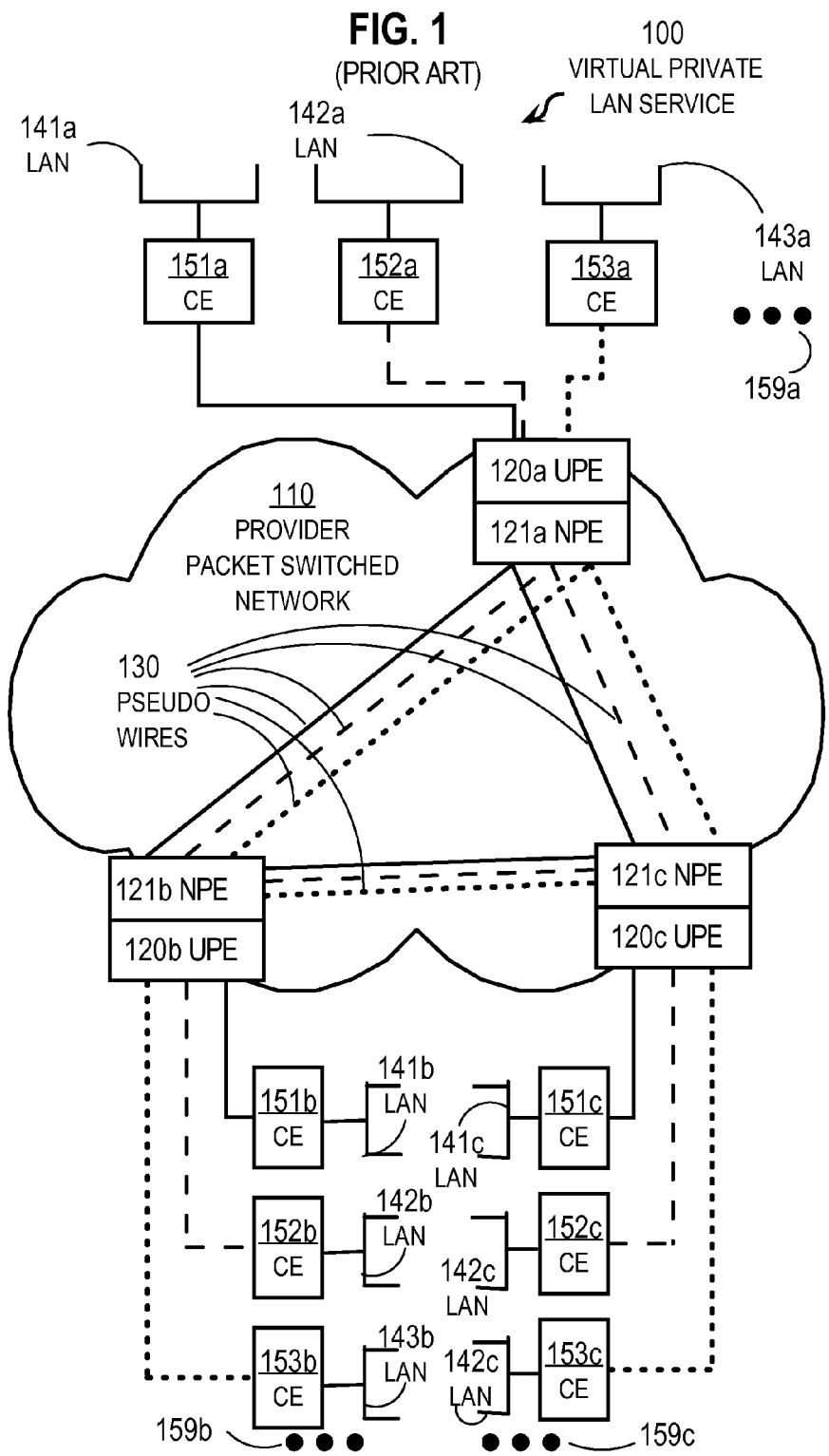
FIG. 1 illustrates an example virtual private LAN Service network using separate tunnels for different customers.

For each new customer who subscribes for VPLS, a SP is taxed with creating and maintaining multiple PWs to and from all that customer's sites. The current approach of creating and maintaining a full mesh of PWs for each customer (a customer is often called a service instance by the SP) multiplies the resources of the SP consumed for each customer taken on. This presents a scaling problem that limits the number of customers to which a SP can provide VPLS, and thus limits the revenue generated from a given set of network resources owned by the SP.

A method and apparatus are described for using the same set of tunnels to provide VPLS for multiple customers and thus provide a more scalable VPLS. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of MPLS tunnels over a single Service Provider (SP) packet-switched network to provide VPLS for multiple customer LANs that use Ethernet packets. However, the invention is not limited to this context. In some embodiments, the same or different tunneling protocols, such as IP tunneling, are used over one or more SP networks to provide one or more VPLS for LANs or VLANs or both, based on Ethernet or other data link layer protocols, for each of one or more entities, including one or more of the SPs.

1.0 Overview

In one set of embodiments, a method includes receiving a data link layer packet, such as an Ethernet packet at a local provider edge node in a provider network from a first customer edge node of multiple customer edge nodes connected directly to the local provider edge node. A tunnel data packet for a particular tunneling protocol is generated. The tunnel data packet includes tunnel data that indicates tunnel t termination at a different provider edge node in the provider network. The tunnel data packet also includes customer identifier data and the data link layer packet. The customer identifier data uniquely indicates a customer associated with the first customer edge node. The tunnel data packet is sent over the provider network.

In other sets of embodiments, an apparatus or a computer readable medium is configured to perform one or more steps of the above method.

By sending customer identification data in the encapsulated data packet, the same tunnels can be used for multiple customers, thus reducing the network resources to provide VPLS for multiple customers.

2.0 VPLS Network Overview

The protocols used in a network are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information, such as the source of the packet, its destination, the length of the payload, and other properties, used by the protocol. Often, the data in the payload for the particular protocol includes a header and payload for a different protocol associated with a different, usually higher layer of the OSI Reference Model. The header for a particular protocol typically indicates a type for the next protocol contained in its payload. The payload protocol is said to be encapsulated in the header protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

The layer 2 tunneling protocol (L2TP) is a data link layer (layer 2) protocol established to provide a persistent virtual circuit as a tunnel between two end nodes of a trusted subnetwork. The persistent tunnel, or virtual circuit, on a packet switched network is often called a pseudo-wire. L2TP facilitates the tunneling of point to point protocol (PPP) packets across an intervening network in a way that is as transparent as possible to both end-users and applications. Using L2TP tunneling, a Service Provider (SP) can create a pseudo wire to link customer's remote sites or remote users with corporate home networks. More recent versions of L2TP facilitates tunneling of a number of data link types, including, but not limited to, Point to Point Protocol (PPP), Frame Relay (FR), Asynchronous Transfer Mode (ATM), High Level Data Link Control (HDLC) and Ethernet. L2TP is described at the time of this writing in Internet Engineering Task Force (IETF) request for comments (RFC) 2661 which can be found in a file named rfc2661.txt, which can be found, along with other RFC files, at the world wide web domain www.ietf.org in the file directory named rfc. L2TPv3 is described in RFC 3817 available in file rfc3817.txt in the same directory.

Some protocols follow a layer 2 protocol and precede a layer 3 protocol; and are said to be layer 2.5 protocols. For example, the Multi-Protocol Label Switch (MPLS) is a layer 2.5 protocol that provides for the designation, routing, forwarding and switching of traffic flows through a network using labels for easier and more efficient switching. MPLS supports the transfer of multiple data link (layer 2) types. MPLS is described at the time of this writing in IETF RFC 3031 and RFC 3032 which can be found in files named rfc3031.txt and rfc3032.tx, the entire contents of each of which are hereby incorporated by reference as if fully set forth herein.

A virtual private network (VPN) is a technology to logically separate the data packets traveling over the same physical network, so that a user of one VPN does not see the data communicated between users of a different VPN. SPs frequently offer to customers VPNs that are implemented as one or more pseudo wires on a packet switched network (PSN) infrastructure, such as a network of routers using the Internet Protocol (IP) as a layer 3 protocol or using MPLS as a layer 2.5 protocol. A common approach for providing the tunneling functions for a VPN is to use the layer 2 tunneling of L2TPv3 as a payload in IP data packets. In some approaches, a protocol for Any Transport over MPLS (AToM) available from CISCO SYSTEMS™, Inc. of San Jose Calif. is used to support layer 2 tunneling in a payload in MPLS data packets. Then layer 2 protocols, such as PPP, FR, ATM, HDLC, Ethernet are used in persistent tunnels to transmit customer data over a VPN.

A customer contracts with an SP to provide a VPN among customer sites and to support certain kinds and amounts of data traffic over that VPN. In response, the SP configures interfaces to customer equipment on several nodes at the edge of an ISP network (so-called "provider edge nodes," PE nodes). Each interface is configured to communicate the type of traffic designated for that interface and encapsulate it in one or more tunnels, each tunnel directed to one of one or more other interfaces on other edge nodes of the ISP network. In the parlance of this technology, configuring each affected interface on each affected edge node provisions the VPN.

A PE interface to customer equipment (CE) is called an attachment circuit (AC) or port. Each physical interface can support one or more logical attachment circuits. For example, a single physical interface for ATM traffic can support multiple ATM virtual circuits, which may be directed to different VPNs; each ATM virtual circuit is considered a different AC to be configured. Configuration data specifies values for one or more parameters for each attachment circuit (AC). The parameters and values depend on the layer 2 protocol to be supported in the VPN, the topology of the VPN, and the tunneling protocol used to establish the pseudo wires. Example configuration data for a logical ATM AC specifies a percentage of total bandwidth devoted to the logical AC, a cell-packing value, the other PE devices in the topology, and a control plane protocol to establish and maintain pseudo wires among the connected PE.

Currently, provisioning the VPN is a manual process, in which a network administrator determines which data packets on each interface are sent out on which link to the provider network using which designations to be recognized by a edge node as a separate tunnel. The manual provisioning process is tedious and error prone.

FIG. 1 illustrates an example virtual private LAN Service network 100 using separate tunnels for different customers, as in the prior art. The network 100 includes a SP packet-switched network 110 to be used to provide the VPLS. The SP network 110 includes provider edge network nodes (collectively referenced hereinafter as PE nodes 120) through which other networks may connect to SP network 110. In the illustrated embodiment, each PE node 120 includes a user-facing PE node (UPE) and a network facing PE node (NPE). The PE nodes 120 include UPE 120a and NPE 121a at a first location, UPE 120b and NPE 121b at a second location, and UPE 120c and NPE 121c at a third location. A UPE and a NPE are typically two separate physical devices. One NPE can be connected to several UPEs. Whey no differentiation between UPE and NPE is required, the term PE is used. In some embodiments, a single PE node 120 performs the functions of both a UPE and an NPE, described in more detail below.

Connected to the SP network 110 through the PE nodes 120 are multiple LANs (collectively referenced hereinafter as LANs 140) for each of multiple customers (also called service instances). In the illustrated embodiment, a first customer has LAN 141a, LAN 141b and LAN 141c, at three different sites. Similarly, a second customer has LAN 142a, LAN 142b and LAN 142c, at an additional three different sites. Similarly, a third customer has LAN 143a, LAN 143b and LAN 143c, at a further additional three different sites. In network 100, the LANs 140 are connected to the PE nodes 120 of the SP network 110 through customer edge network nodes (collectively referenced hereinafter as CE nodes 150). The first customer's LAN 141a, LAN 141b, LSN 141c are connected to CE node 151a, CE node 151b, CE node 151c, respectively. The second customer's LAN 142a, LAN 142b, LSN 142c are connected to CE node 152a, CE node 152b, CE node 152c, respectively. The third customer's LAN 143a, LAN 143b, LSN 143c are connected to CE node 153a, CE node 153b, CE node 153c, respectively. Other CE nodes 150 are indicated by ellipses 159a, 159b, and 159c.

Each PE node 120 is connected to one or more CE nodes 150 of corresponding customers. For example, in the illustrated embodiment, UPE 120a at one location is connected to CE node 151a of the first customer and to CE node 152a of the second customer and to CE node 153a of the third customer and to other CE nodes, indicated by ellipses 159a, of other customers. Similarly, UPE 120b at another location is connected to CE node 151b of the first customer and to CE node 152b of the second customer and to CE node 153b of the third customer and to other CE nodes, indicated by ellipses 159b, of other customers. Similarly, UPE 120c at yet another location is connected to CE node 151c of the first customer and to CE node 152c of the second customer and to CE node 153c of the third customer and to other CE nodes, indicated by ellipses 159c, of other customers.

In a current approach, VPLS is provided to each customer by forming a point to point pseudowire (PW) among the PE devices which are connected to the CE devices of the same customer. FIG. 1 depicts a full mesh of PWs 130 in the SP network 110 for three of the customers of the illustrated embodiment.

Point to point PWs 130 are formed for the first customer, indicated by the solid lines. Similarly, point to point PWs 130 are formed for the second customer, indicated by the dashed lines, and for the third customer indicated by the dotted (short dashed) lines. A full mesh of nine PWs is formed to provide VPLS for just three customers, in the illustrated embodiment. Although a particular number of LANs 140, CE nodes 150, PE nodes 120, SP networks 110 and PWs 130 are shown in FIG. 1 for purposes of illustration, in other embodiments one or more different numbers of LANs, CE nodes, PE nodes, SP networks or PWs, or some combination comprise a VPLS network.

In practice, a SP network has hundreds of PEs, each serving many of tens of thousands of customers. It is assumed for purposes of illustration that each customer has ten sites; each customer then requires 9+8+7+6+5+4+3+2+1=45 PWs. An SP with 25,000 customers then has to construct and maintain over a million PWs, e.g., 1,125,000 PWs.

Furthermore, to determine which PW to use to tunnel an Ethernet packet, each PE node 120 has to learn many MAC identifiers, and associate each with one of the PWs terminating at the PE. For example, it is assumed for purposes of illustration that the SP has an average of 1000 customers per PE node. As assumed above, the average customer has ten sites, therefore 9 PWs emanate from each PE for each customer and 9000 PEs emanate from each PE. It is further assumed that each customer has 100 MAC identifiers (about 10 nodes per LAN). Thus each PE must form and maintain 9000 PWs and learn 100,000 MAC identifiers and associate each with one of the 9000 PWs or one of the 1000 local interfaces to local CE nodes 150 connected directly to the PE. The storage capacity and computational load on the PE is severe, and limits the number of customers an SP can service with a given suite of equipment.

Furthermore, when a node in a LAN issues a broadcast or multicast packet that is directed to LANs at multiple customer sites, the PE nodes 120 must replicate the message and send each replicated message separately over several or all pseudo wires to multiple CE nodes 150. This increases the work load at a PE compared to issuing a single data packet directed to a multicast group, as allowed by both IP and MPLS protocols.

3.0 Modified Tunnels for VPLS

According to various illustrated embodiments of the invention, fewer tunnels are generated and maintained among PE nodes, and traffic from several customers use the same tunnel. Furthermore, in the illustrated embodiments, L2TPv3 or MPLS PWs are replaced by unicast and multicast tunnels native to the service provider network, such as MPLS and IP. The data packets sent over these tunnel include not only the tunnel header and the customer's Ethernet frame, but also data that uniquely identifies the customer, so that the receiving PE node 120 can ascertain to which interface (e.g., to which CE node 150) the Ethernet frame extracted form the tunneled data packet should be forwarded. In some embodiments, the tunneled data packet includes other data that indicates how to extract and forward the packet. For example, in some embodiments, data is included that indicates the Ethernet frame is a MAC-in-MAC frame. As explained in further detail below, the MAC-in-MAC construct limits the number of MAC addresses a PE node has to learn.

Figure 2:
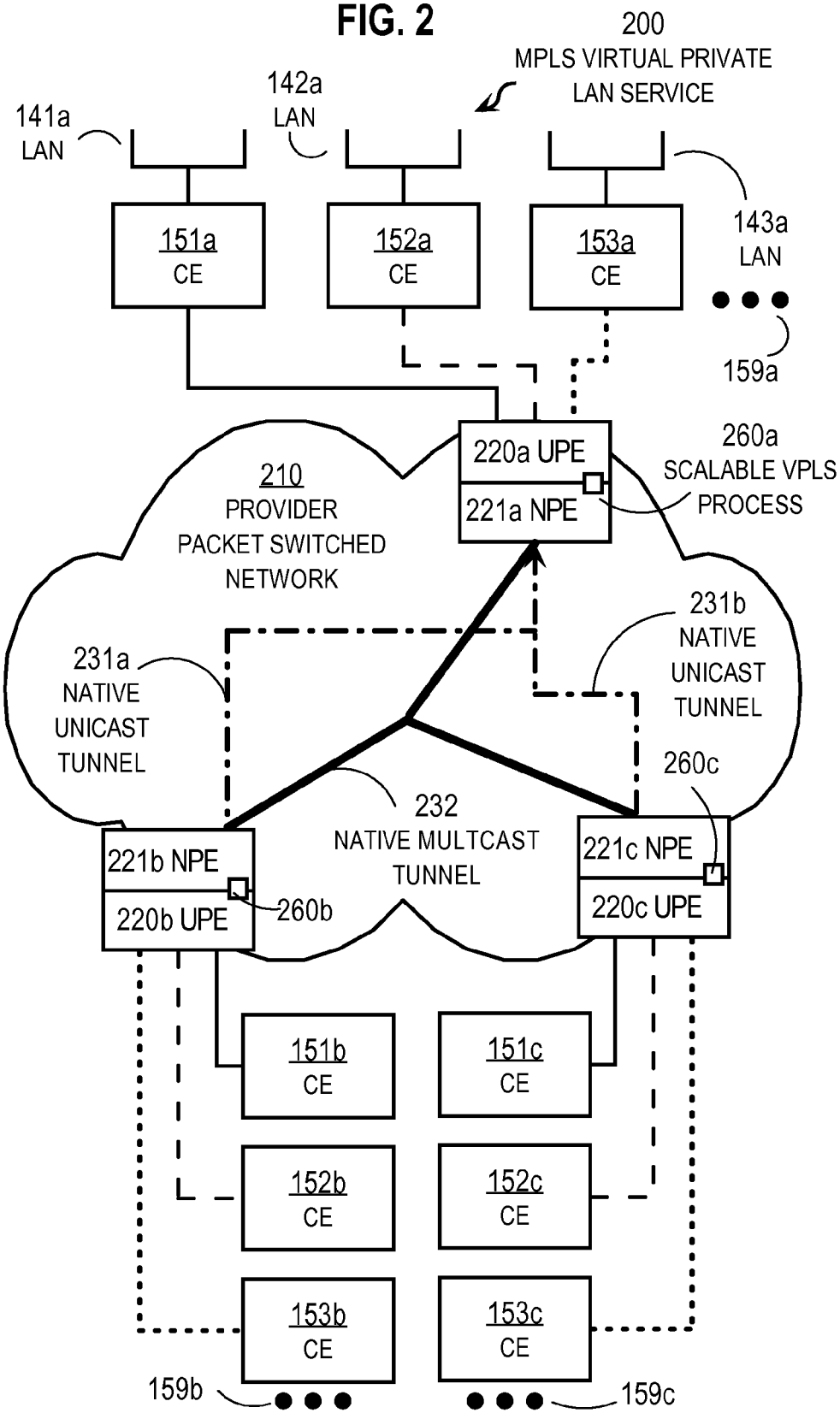
FIG. 2 illustrates an example virtual private LAN Service network using the same tunnel for different customers.

FIG. 2 illustrates an example virtual private LAN Service network 200 using the same tunnel for different customers. The LANs 140 and CE nodes 150 are the same as depicted in FIG. 1. The SP network 210 includes modified provider edge network nodes (collectively referenced hereinafter as PE nodes 220) through which other networks may connect to SP network 210. In the illustrated embodiment, each PE node 220 includes a user-facing PE node (UPE) and a network facing PE node (NPE). The PE nodes 220 include UPE 220a and NPE 221a at a first location, UPE 220b and NPE 221b at a second location, and UPE 220c and NPE 221c at a third location; the same locations as occupied in FIG. 1 by the PE nodes 120. In some embodiments, a single PE node 220 performs the functions of both a UPE and an NPE, described in more detail below.

In the illustrated embodiment, each PE node 220 includes a scalable VPLS process: scalable VPLS process 260a at a first location, scalable VPLS process 260b at a second location, and scalable VPLS process 260c at a third location, (collectively referenced hereinafter as scalable VPLS process 260). In the illustrated embodiment with a UPE and NPE in each PE node 220, the scalable VPLS process 260 is distributed between the UPE node and the NPE node. In some embodiments the scalable VPLS process 260 is executed entirely in the NPE node; and, in other embodiments, the scalable VPLS process 260 is executed entirely in the UPE node.

Unlike the prior approach, each PE node uses a single tunnel to the other PE nodes to carry VPLS traffic for multiple customers (other tunnels, including other PWs, not shown, may also be formed for other purposes). In the illustrated embodiment, a single unicast tunnel 231a is used to send data packets to NPE 221a from NPE 221b for multiple customers, another single unicast tunnel 231b is used to send data packets to NPE 221a for multiple customers. Unlike PWs, these tunnels use native unicast features of IP (or MPLS) and do not need to be established by exchanging signaling packets (e.g., there is no need to use targeted LDP or L2TPv3 signaling for MPLS or IP network respectively. The IP address or the outer MAC address or the MPLS label associated with the destination node (e.g, NPE 221a) is sufficient to generate and send a tunneled data packet.

Also, in the illustrated embodiment, a single multicast tunnel 232 is established among NPE 221a, NPE 221b and NPE 221c for multiple customers. A multicast group is defined by some initial signaling among the nodes involved, but once a multicast group is formed, a single data packet input by any member is automatically replicated and delivered to all the other members by the native protocols of the provider network 210. Thus, the use of native multicast tunnels saves resources on the PEs and allows a service provider to serve more customers with the same PE nodes 220.

The tunnels 231a, 231b, 232 are collectively referenced hereinafter as multiple service instance tunnels 230. These tunnels 230 terminate on a PE node, such as a NPE node or a UPE node, as indicated, for example, by the node's loop-back IP address or MAC address.

In the prior approaches, each PW is configured to terminate on a particular forwarder within a PE; and, therefore, to offload its payload, a layer 2 data frame, onto the attachment circuit connected to that forwarder. In the illustrated embodiment, the PE node that terminates the multiple service instance tunnel 230 must determine through which of multiple attachment circuits to forward the tunnel's payload. Therefore the tunneled data packet is modified to include, outside the encapsulated layer 2 data frame, customer information used to indicate the forwarder for that customer and hence the attachment circuit connected to the CE node of that customer.

Although a particular number of LANs 140, CE nodes 150, PE nodes 220, scalable VPLS processes 260, SP networks 210 and multiple service instance tunnels 230 are shown in FIG. 2 for purposes of illustration, in other embodiments one or more different numbers of LANs, CE nodes, PE nodes, SP networks or multiple service instance tunnels, or some combination are included.

Figure 3A:
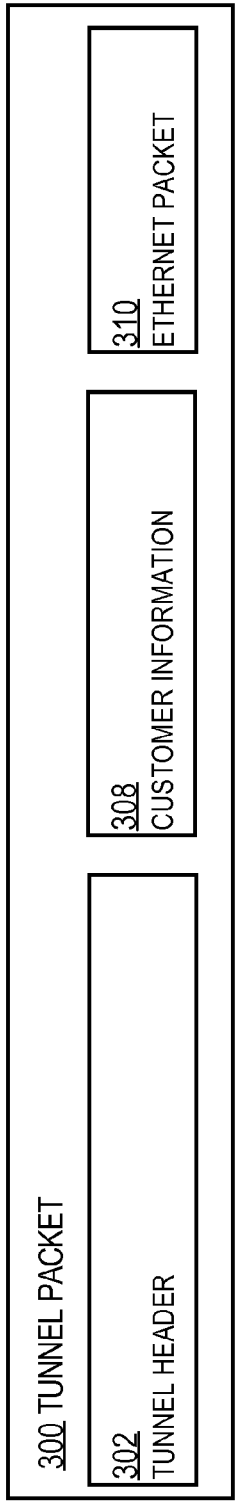
FIG. 3A illustrates an example tunnel packet according to one embodiment.
Figure 3B:
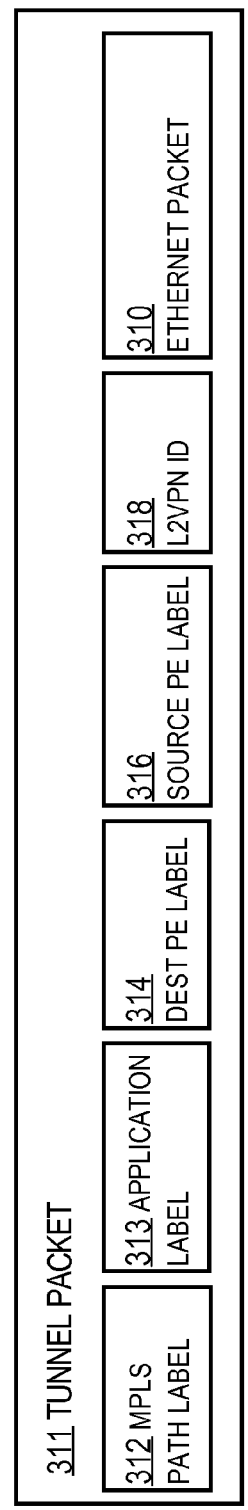
FIG. 3B illustrates an example tunnel packet according to a second embodiment.
Figure 3C:
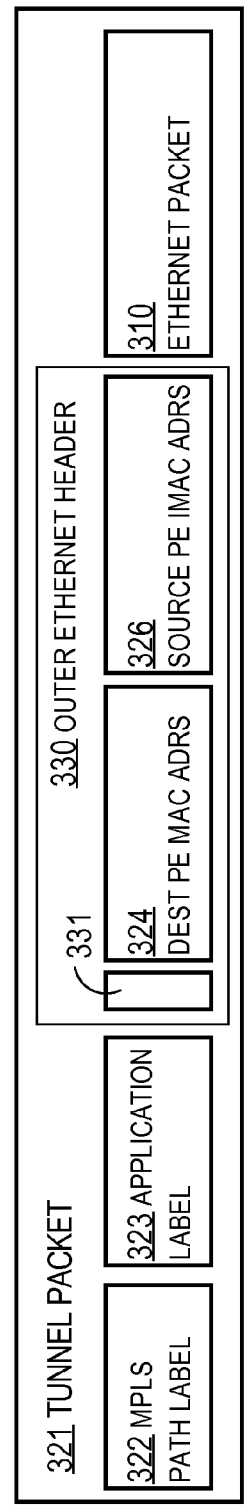
FIG. 3C illustrates an example tunnel packet according to a third embodiment.

Three different embodiments for providing the customer information in extra fields in the tunneled data packet are illustrated in FIG. 3A, FIG. 3B and FIG. 3C. In other embodiments, other fields are used to convey the customer information. For purposes of illustration, the layer 2 data frame received through an attachment circuit with a CE node 150 is an Ethernet packet 310 in FIG. 3A, FIG. 3B and FIG. 3C.

FIG. 3A illustrates an example tunnel packet 300 according to one embodiment. The tunnel packet 300 includes a tunnel header portion 302, a customer information field 308, and the Ethernet packet 310. Not depicted are a layer 1 header and a layer 2 header that precede the tunnel header 302 for transmission across individual communications links in a SP network, e.g., in SP network 210. Although depicted outside tunnel header field 302 in FIG. 3A, in some embodiments, customer information field 308 is included inside tunnel header 302.

The tunnel header portion 302 includes the header portion for any tunneling protocol, such as an IP header and L2 VPN header, an IP tunneling header, or an MPLS header, used to form a tunnel across a SP network (e.g., SP network 210) from one PE node 120 to a different PE node 120. For example, the tunnel header portion 302 holds an IP header as tunnel 231a between NPE 221a and NPE 221b. In some other embodiments, the tunnel header portion 302 holds one or more MPLS labels for a MPLS path as tunnel 231a from NPE 221b to NPE 221a, or as multicast tunnel 232. In some embodiments, the tunnel header portion 302 holds one or more IP tunneling fields for an IP path as tunnel 231a from NPE 221b to NPE 221a, or as multicast tunnel 232.

The customer information field 308 holds data that indicates the particular customer for which a VPLS is to carry the Ethernet packet 310, e.g., with an identifier that uniquely identifies the customer within the service provider network. For example, in some embodiments, the customer information field holds a label distributed by a label distribution protocol (e.g., LDP) that distinguishes among the first customer, the second customer, the third customer, and other customers who use CEs indicted by ellipses 159a. In some embodiments, one or more fields in the tunnel header portion 302 hold data that indicates the customer information field 308 and precedes the Ethernet packet 310.

Although data fields and portions of tunnel packet 300 are depicted as contiguous portions of data in a particular order for purposes of illustration, in other embodiments, one or more fields or portions of tunnel packet 300, or sub-portions thereof, occur in a different order.

FIG. 3B illustrates an example tunnel packet 311 according to a second embodiment. The tunnel packet 311 includes an MPLS path label field 312, an application label field 313, a destination PE label field 314, a source PE label field 316, a L2VPN identifier field 318, and the Ethernet packet 310. Not depicted are a layer 1 header and a layer 2 header that precede the MPLS path label field 312 for transmission across individual communications links in a SP network, e.g., SP network 210. MPLS works by appending an MPLS header containing one or more 'labels' called a label stack in front of headers of other higher layer protocols. In the illustrated embodiment, each of fields 312, 313, 314, 316 and 318 is an MPLS label. The label distribution protocol (LDP), described in RFC 3036 and available in rfc3036.txt, is used to distribute the labels among participating PE nodes in the SP network 210. In other embodiments, other label distribution systems may be used.

The MPLS path label field 312 is the outermost (top of the stack) label that holds data that indicates a path label that is used to carry the tunneled data packet 311 to the egress PE node (e.g., to NPE node 221a). To support MPLS paths, the SP network 210 includes label switching routers (LSR) as intermediate network nodes. Each path is identified at one PE node by a label associated with a destination PE node. Any method may be used to identify uniquely the destination PE node. For purposes of illustration, it is assumed that the destination PE node is uniquely identified by its loop-back IP address. In the following, for purposes of illustration, the MPLS label used at one PE to indicate a path to a destination PE is signified by the letters modifying the call out numbers for the two PEs. Thus the MPLS label at PE 221*a* for the path to PE 221*b* is signified by AB.

A MPLS path is implemented by label based routing tables at each LSR between the PE nodes 221. An MPLS packet with a particular outermost label arrives at an inbound network interface on an LSR. The LSR employs a look up a table that associates the particular label with a second label that is associated with a particular outbound network interface. For purposes of illustration, it is assumed that the outbound network interface is identified uniquely by its own IP address or a relative address at the IP address of the loop back interface that identifies the node itself. The MPLS packet is sent out over the outbound network interface with the second label. Thus routing is performed without regard to the header encapsulated in the MPLS packet, such as the IP addresses in an IP header or MAC addresses in the Ethernet packet 310. Similarly, at the next LSR, a look up table associates the second label on an inbound network interface with a third label that is associated with one of the next LSR outbound network interfaces. As a PE node joins the network (e.g., network 210) according to MPLS, that node advertises its label to adjacent LSRs, which propagate this information across the network. Thus each PE node learns of the existence of the other PE nodes in the network as those PE nodes join.

The application label field 313 holds data that indicates an application label used to ensure that the labels for the source and destination PE nodes, described next, are unique at each PE throughout the SP network 210. In some embodiments the application label field 313 is needed if the destination PE node is short on unique labels (label space). The data in the application label field 313 is used, in some embodiments, to indicate that the following labels are to be interpreted within the context of a private label space on the destination PE node. In some embodiments, the application label field 313 is omitted.

The destination PE label field 314 holds data that indicates a label for the destination PE node (for the path indicated in the MPLS path label field 312). The destination PE node is associated with the label in the field 314 by a labeling authority for the SP network 210 and it is unique within the service provider network.

The source PE label field 316 holds data that indicates a label for the source PE node (for the path indicated in the MPLS path label field 312). The source PE node is associated with the label in the field 316 by the labeling authority for the SP network 210 and it is unique within the service provider network.

The L2VPN ID field 318 holds data that indicates the customer and is configured for each of the PE nodes. For purposes of illustration it is assumed that the UPE node 220*a* is configured so that the attachment circuit to CE node 151*a* is associated with L2VPN ID="SI0001," the attachment circuit to CE node 152*a* is associated with L2VPN ID="SI0002," the attachment circuit to CE node 153*a* is associated with L2VPN ID="SI0003," to indicate the first customer, the second customer and the third customer, respectively. Similarly, it is assumed that the UPE node 220*b* is configured so that the attachment circuit to CE node 151*b* is associated with L2VPN ID="SI0001," the attachment circuit to CE node 152*b* is associated with L2VPN ID="SI0002," the attachment circuit to CE node 153*b* is associated with L2VPN ID="SI0003," to indicate the first customer, the second customer and the third customer, respectively. Likewise, it is assumed that the UPE node 220*c* is configured so that the attachment circuit to CE node 151*c* is associated with L2VPN ID="SI0001," the attachment circuit to CE node 152*c* is associated with L2VPN ID="SI0002," the attachment circuit to CE node 153*c* is associated with L2VPN ID="SI0003," to indicate the first customer, the second customer and the third customer, respectively.

L2VPN reachability information (that indicates which PE nodes are connected to CE nodes for which L2VPN IDs) is distributed by an internal gateway protocol (such as Open Shortest Path First Protocol, OSPF, or Intermediate System to Intermediate System protocol, ISIS), for one service provider, or by a external gateway protocol (such as the Border Gateway Protocol, BGP) for multiple service providers, as is well known in the art. In some embodiments, L2VPN IDs are unique only within the network of one service provider. In some such embodiments, a VPLS that crosses the networks of several service providers includes in V2VPN ID field 318 a service provider label, so that the contents of field 318 are unique across networks of multiple SPs. In some embodiments, only a portion (e.g., 4 bytes) of the L2VPN ID (8 bytes) is used in field 318.

In this embodiment, the tunnel information is included in fields 312, 313, 314, 316 and the customer information is included in field 318. When the tunneled data packet arrives at NPE node (e.g., NPE 221*a*), the Ethernet packet 310 is unloaded and forwarded to the CE node 150 that belongs to the customer identified in the field 318. For example, the entire tunneled packet is forwarded over multicast tunnel 232 to each UPE which unloads the Ethernet packet and determines which interface to use based on the contents of the L2VPN ID field 318.

Once the initial tunneled data packet 311 has been sent using a multicast MPLS tree, in the illustrated embodiment, learning occurs based on the pair of labels in the destination PE label field 314 and the source PE label field 316. The MAC addresses in the Ethernet packet 310 (and any IP addresses in an IP packet encapsulated in the Ethernet packet 310) are not used. This greatly reduces the consumption of network resources on PE nodes 220 for providing VPLS and increases the scalability of the service. In some embodiments, the recipient PE also learns the MAC addresses in the Ethernet packet 310 and associates this MAC address with the contents of the source PE label field 316.

FIG. 3C illustrates an example tunnel packet 321 according to a third embodiment. The tunnel packet 321 includes an MPLS path label field 322, an application label field 323, an outer Ethernet header 330 for MAC-in-MAC encapsulation according to IEEE 802.1ah, and the Ethernet packet 310. Not depicted are a layer 1 header and a layer 2 header that precede the MPLS path label field 322 for transmission across individual communications links in a SP network, e.g., SP network 210. In the illustrated embodiment, each of fields 322 and 323 is an MPLS label. LDP is used to distribute the labels among participating PE nodes in the SP network 210. The outer Ethernet header 330 includes a leading four bits 331, a destination PE MAC address field 324 and a source PE MAC address field 326. Unlike tunnel packet 311, the destination PE MAC address field 324 and source PE MAC address field 326 in tunnel packet 321 are not MPLS labels. Instead, the destination PE MAC address e field 324 and source PE MAC address field 326 are fields in a MAC-in-MAC Ethernet frame outer header 330 and hold MAC addresses of those nodes.

The MAC-in-MAC construct is described in Institute for Electrical and Electronics Engineering (IEEE) standard 802.1ah, the entire contents of which are hereby incorporated by reference as if fully set forth herein. According to the MAC-in-MAC construct, an LAN or VLAN Ethernet frame (e.g., Ethernet frame 310) is encapsulated in an outer Ethernet header, as is well known in the art. This allows for layering the Ethernet network into customer and provider domains with complete isolation among their MAC addresses. The outer Ethernet header uses destination and source MAC addresses of network backbone devices, called B-MAC addresses.

The MPLS path label field 312 is the outermost (top of the stack) label that holds data that indicates a path label that is used to carry the tunneled data packet 311 to the egress PE node (e.g., to NPE node 221b).

The application label field 323 holds data that indicates an application label used to ensure that the PE nodes treat the following fields as a MAC-in-MAC header for VPLS applications. In some embodiments, the application label field 323 is distributed as described above for application label field 313.

The leading four bits field 331 includes the first four binary digits of the outermost MAC-in-MAC Ethernet header. In one embodiment, the leading four bits in this field are used instead of application label to identify the Ethernet frame within the MPLS packet so that proper hashing for the purpose of load balancing can be performed when Equal Cost Multiple Paths (ECMPs) is encountered. A particular set of values in these bits indicates an Ethernet frame; a first value (ox5, hexadecimal,=0101 binary=5 decimal) indicates a unicast Ethernet frame and a second value (oxC=1100 binary=12 decimal) indicates a multicast Ethernet frame. According to the well known 802.1ah standard, a particular value in an Ether type field (not shown) indicates a MAC-in-MAC header, which is followed by a full Ethernet frame with an Ethernet header and Ethernet payload. In some embodiments, each PE node uses the first four bits 331 to determine that the encapsulated frame is an Ethernet frame instead of an IP packet or other protocol packet. In some of these embodiments, the application label field 323 is omitted.

The destination PE MAC address field 324 holds data that indicates a B-MAC address for an interface on the destination PE node that is an attachment circuit for a particular CE node 150, e.g., the interface on UPE node 220b for the attachment circuit to CE node 151b. Thus all customer MAC addresses on LAN 141b are hidden behind the B-MAC address of the interface on the UPE node 220b. This B-MAC address is globally unique. In some embodiments, the B-MAC address is assigned to the UPE instead of the interface on the UPE. In these embodiments, the UPE node 220 must learn the MAC addresses for each of its interfaces to a different CE node 150. The B-MAC addresses of these interfaces are distributed to all the PEs by an IGP such as OSPF or ISIS. Between different service providers, the B-MAC addresses are distributed using BGP.

The source PE MAC address field 324 holds data that indicates a B-MAC address for an interface on the source PE node that is an attachment circuit for a particular CE node 150, e.g., the interface on UPE node 220a for the attachment circuit to CE node 151a. Thus all customer MAC addresses on LAN 141a are hidden behind the B-MAC address of the interface on the UPE node 220a. In some embodiments, the B-MAC address is assigned to the UPE instead of the interface on the UPE. In these embodiments, the UPE node 220 must learn the MAC addresses for each of its interfaces to a different CE node 150, based on the encapsulated Ethernet packet 310.

In this embodiment, the tunnel information is included in field 322 and 323 and the customer information is included in fields 324 and 326.

Once the tunnel packet 321 is received at the destination PE node (e.g., NPE node 221a), the destination PE relies on the application label field 323 to determine whether to treat the packet as a MAC-in-MAC frame or not. As a result, the MAC-in-MAC frame following the MPLS tunnel label does not get misinterpreted as an IP or an operation, administration, and maintenance (OAM) frame. If application label is omitted, the penultimate-hop PE (e.g., the NPE) upon removing the tunnel label sends the MAC-in-MAC frame in native Ethernet format to the destination PE (e.g., the UPE) and the destination PE recognizes this MAC-in-MAC frame based on its Ether Type.

Once the initial tunneled data packet 321 has been sent using a multicast MPLS tunnel 232, in the illustrated embodiment, learning at the NPEs occurs based only on the pair of labels in the destination PE MAC address field 324 and the source PE MAC address field 326. The MAC addresses in the Ethernet packet 310 (and any IP addresses in an IP packet encapsulated in the Ethernet packet 310) are not used. This greatly reduces the consumption of network resources on PE nodes 220 for providing VPLS; and increases the scalability of the service.

3.0 Method at Provider Edge

Figure 4A:
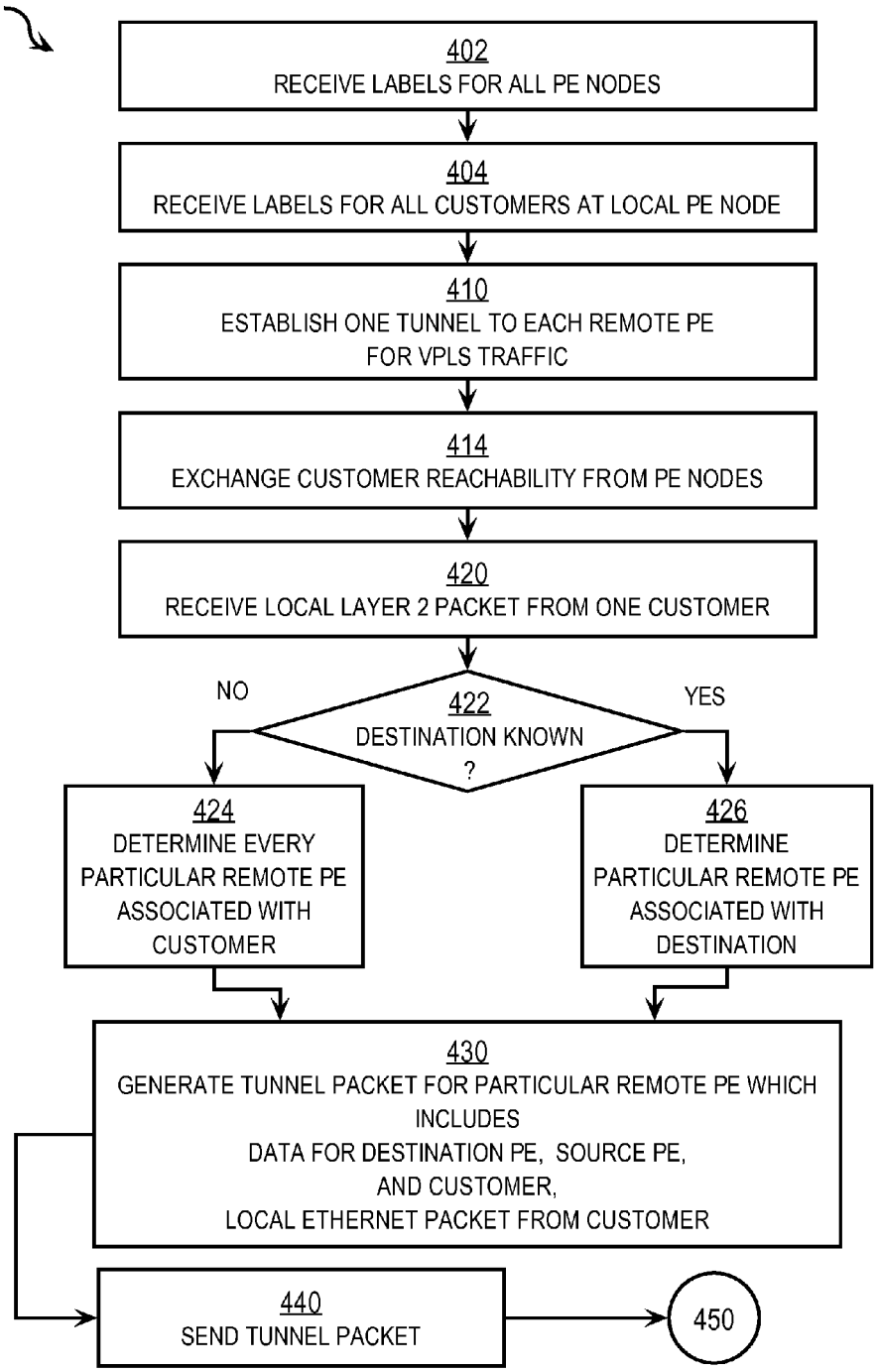
FIG. 4A and FIG. 4B illustrate at a high level an example method at a provider edge node.
Figure 4B:
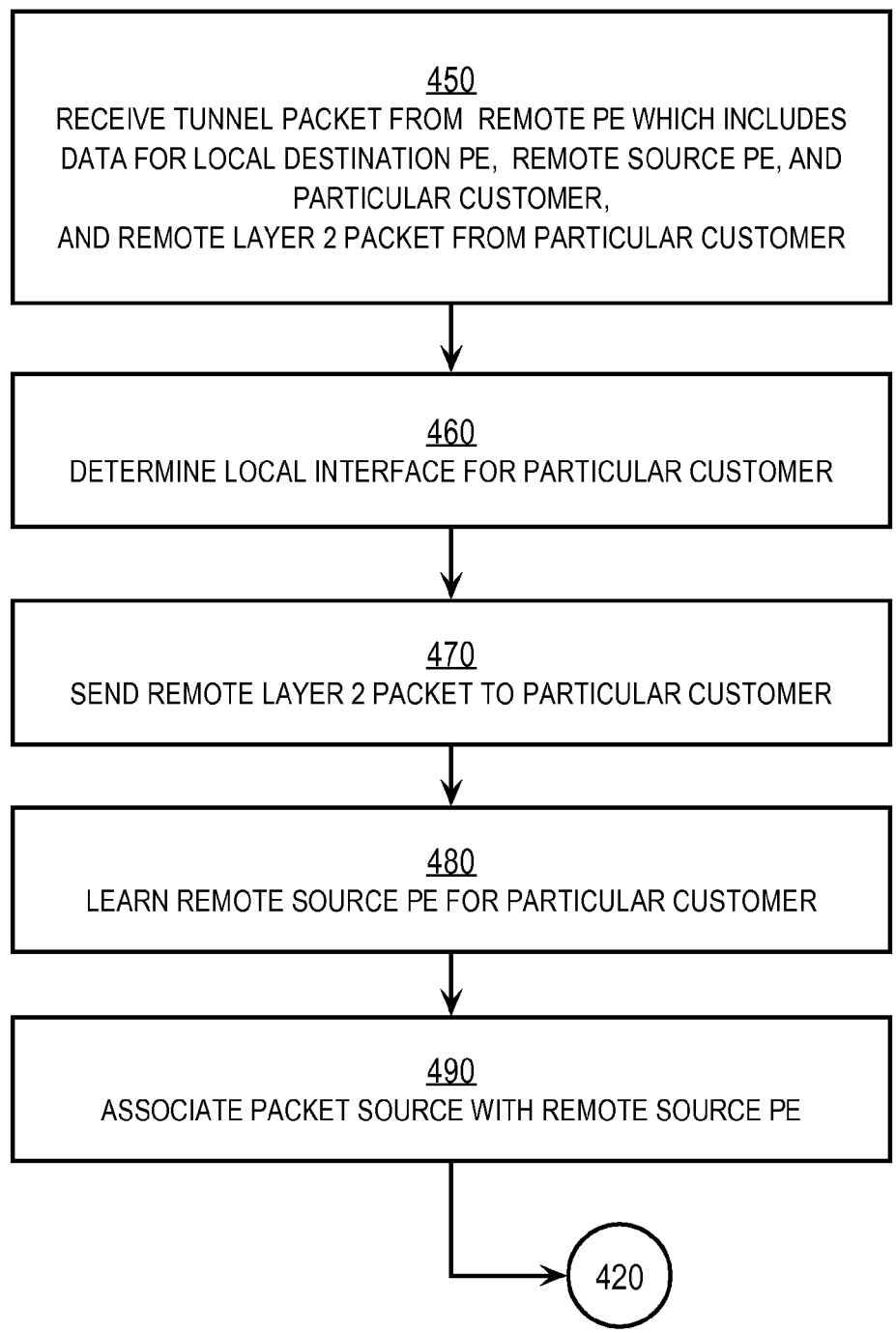

FIG. 4A and FIG. 4B illustrate at a high level an example method 400 at a provider edge node. Although steps are shown in FIG. 4A and FIG. 4B in a particular order for purposes of illustration, in other embodiments, one or more steps are performed in a different order, or overlapping in time, in one or more serial or parallel processes, or one or more steps are omitted, or some combination of changes are made. Furthermore, in some embodiments with a PE node comprising a NPE and a UPE, some steps are performed by the UPE and some steps are performed by the NPE. For purposes of illustration, it is further assumed that method 400 executes in scalable VPLS process 260a on NPE 221a and UPE 220a.

In step 402, labels are received for all PE nodes in a network of one service provider (all nodes in a network of one service provider constitute an autonomous system, AS). In some embodiments, step 402 includes receiving an application label to distinguish tunnels that are used for VPLS from other tunnels. In some embodiments, step 402 includes receiving an application label to distinguish labels that are used for one service provider from labels used for different service providers. In some embodiments, step 402 includes receiving an application label to indicate that the PE labels are to be interpreted out of a private label space on each PE, for example, if that PE is short on label space.

Any method may be used to receive these labels. For example, in various embodiments, the data is included as a default value in software instructions, is received as manual input from a network administrator on the local or a remote node (e.g., during manual configuration), is retrieved from a local file or database, or is sent from a different node on the network, either in response to a query or unsolicited, or the data is received using some combination of these methods.

In an illustrated embodiment using tunnel packet 311, the destination PE node is associated with the label in the field 314 by a labeling authority for the SP network 210.

In an illustrated embodiment using tunneling packet 321, the label is a B-MAC address associated with a UPE, or each interface on a UPE connected to a CE node 150. In some embodiments, the B-MAC addresses and application label are distributed as an attribute of the IPv4 address using an IGP within a SP network. In some embodiments, the B-MAC addresses and application labels are each distributed as an alias for other MAC addresses using BGP across different SP networks.

In various embodiments using tunneling packet 321 with an application label field 323 that indicates a VPLS application, the application label for field 323 is also received via LDP sessions or BGP sessions or statically configured. In embodiments using an application label field 313 that indicates a particular label space, the application label for field 313 is also received via LDP messages from each PE node that may be a destination PE for VPLS and uses a particular label space. In some of these embodiments, step 402 includes sending a LDP message indicating a particular label space for a UPE as an attribute of the IP address of the associated NPE.

In step 404, labels are received for all customers attached to the local PE node. In some embodiments, step 404 includes receiving L2VPN ID as configuration data for each interface on a UPE. In some embodiments, such as embodiments using tunnel packet 321 with B-MACs terminating the tunnel, each UPE interface label is associated with a particular customer ID.

In step 410 a tunnel is established with each remote PE for VPLS traffic. For example, NPE 221a creates a MPLS label AB to indicate a labeled path to NPE 221b and a MPLS label AC to indicate a labeled path to NPE 221c. This along with the propagation of labels as a node joins the network, is sufficient to use the tunnel. In some embodiments, a multicast group is defined during step 410, e.g., using the multicast definition procedures of Protocol Independent Multicast (PIM) for IP or the multicast definition procedures for MPLS.

In step 414, data is exchanged to indicate what customers are reachable from each PE. For example, UPE 220a sends data that indicates the L2VPN IDs or Customer IDs by an IGP, such as OSPF or ISIS. This information is distributed to another SP network, if needed, using BGP at a border gateway router. In the illustrated embodiments, this information is learned from data packets received over the multicast tunnel 232, and step 414 is omitted.

In step 420, a local layer 2 packet is received from one customer. For example, an Ethernet packet is received at UPE 220a from CE 152a on a particular interface.

In step 422, it is determined whether the destination of the layer 2 packet is known to be associated with a particular remote PE. If not, control passes to step 424. In step 424, every remote PE associated with the same customer is determined. For example the multicast group for all PEs is determined and used as the destination for the tunneled data packet. Control then passes to step 430.

If it is determined in step 422 that the destination of the layer 2 packet is known to be associated with a particular remote PE, then control passes to step 426. In step 426, a particular remote PE that is associated with the destination is determined. For example, the IP address or MPLS label for the particular remote PE is used as the destination for the tunneled data packet. Control then passes to step 430.

In step 430 a tunnel packet is generated for the one or more particular remote PEs. In various embodiments, the tunnel packet includes destination PE data, source PE data, customer data and the local layer 2 packet from the customer, as described above. Control then passes to step 440. MPLS labeling does not identify the source of an MPLS packet. In the illustrated embodiments, the source of the MPLS packet is included in a secondary MPLS label, e.g. in label field 316 of packet 311 and in MAC address field 326 in packet 321.

In step 440, the tunnel packet is sent over the SP network. Step 440 need not be repeated for every remote PE determined in step 424 or step 426 if a multicast tunnel 232 is used.

Control then passes to step 450 depicted in FIG. 4B.

In step 450 a tunnel packet is received from a remote PE. In various embodiments, the tunnel packet includes local destination PE data, remote source PE data, customer data indicating a particular customer and the remote layer 2 packet from the particular customer.

In step 460, the local interface for the particular customer is determined based on the customer data.

In step 470, the remote layer 2 packet is extracted from the tunnel packet and placed on the local interface for the particular customer.

In step 480, the remote PE for the particular customer is learned if not already known.

In step 490, the layer 2 source indicated in the remote layer 2 packet is associated with the remote source PE, so that subsequent unicast local layer 2 packets are sent only to the involved remote PE in step 422 and step 426, described above.

Control then passes back to step 420 to receive the next local Ethernet packet and ultimately to step 450 to receive the next tunnel packet from the SP network.

As stated above, in some embodiments one or more steps are performed in a different order. For example, it is common to perform step 480 and step 490 before step 460.

The method 400 is further described using two example embodiments. In a first example embodiment, an MPLS tunnel is used at NPE nodes with tunnel packet 311 using only MPLS labels and omitting the application label 313. In a second example embodiment, an MPLS tunnel is used at NPE nodes with tunnel packet 321 based on the MAC-in-MAC Ethernet frame and omitting application label 323.

In the first example embodiment, an MPLS tunnel is used with tunnel packet 311 using only MPLS labels and omitting the application label 313. In step 402, data is received indicating labels for all PE nodes. For purposes of illustration, it is assumed that the SP network is SP network 210 and that the labels received are as listed in Table 1. Because these labels are distributed using LDP, every LSR and PE in SP network 210 is aware of these labels and associated IP addresses

TABLE 1

Example labels for PE nodes in an MPLS network.

| Node | IP address | label |
|------|------------|-------|
| 221a | 123.45.67.89 | P500001 |
| 221b | 123.45.76.98 | P500002 |
| 221c | 123.45.12.34 | P500003 |

In step 404 the labels are received for all customers at the local PE node. For example, the L2VPN IDs for all the customers at UPE 1210a are received. For purposes of illustration it is assumed that the UPE node 220a is configured so that the attachment circuit to CE node 151a is associated with L2VPN ID="SI0001," the attachment circuit to CE node 152a is associated with L2VPN ID="SI0002," the attachment circuit to CE node 153a is associated with L2VPN ID="SI0003," to indicate the first customer, the second customer and the third customer, respectively.

In step 410, a MPLS multicast group is defined including all PE for VPLS traffic. For example, a multicast group is defined for multicast tunnel 232.

Because customer IDs are learned based on received data packets, step 414 is omitted.

In step 420, a local layer 2 packet is received from one customer. For example, an Ethernet packet 310 is received from LAN 142b through CE node 152b at a particular interface on UPE 220b. The configuration data at UPE 220a indicates that this data packet has L2VPN ID SI0002. At first, no node on LAN 142a knows any MAC addresses on LAN 142b or 142c. So, the Ethernet packet 310 is to be included in a tunnel packet if it has a broadcast MAC destination address.

In step 422, it is determined whether the destination of the layer 2 packet is known to be associated with a particular remote PE. The broadcast MAC destination address is not associated with a particular remote PE, so control passes to step 424. In step 424, every remote PE is considered a destination for the local layer 2 data packet.

In step 430, a tunnel packet is generated for multicast tunnel 232. For example, tunnel packet 331 with values in Table 2 are generated by UPE 220a.

TABLE 2

Example tunnel packet for Ethernet packet from LAN 142a.

| Field | packet |
|---|---|
| MPLS Path Label | multicast tunnel |
| Application Label | (not used) |
| Destination PE Label | multicast |
| Source PE Label | P500002 |
| L2VPN ID | SI0002 |
| Ethernet packet | From CE 152b |

In step 440, the generated MPLS tunnel packets are sent over the SP network 210. The network 210 supports multicasts and therefore the network nodes 210 replicate the data packet at branch points as needed. This reduces the work done by UPE node 220b or NPE node 221b, which does not have to replicate the data packet for each destination PE node. For example, the tunnel packet listed in Table 2 is forwarded from UPE 220b to NPE 221b. The MPLS Path label is switched rapidly by LSRs in SP network 210 and replaced at each hop. An advantage of this embodiment is that this routing is done with standard short (20 bit) lookups per label. It is noted that MAC-in-MAC frames use 48 bit lookups for each label that consume more expensive memory and larger T-CAM blocks. Flow based IP routing can involve even more extensive lookups and consumes even more resources.

To illustrate steps 450 through 490, it is assumed that the packet listed in Table 2 is received at NPE 221a after traversing SP network 210 through tunnel 232. In step 450, the packet listed in Table 2 is received at NPE 221b and forwarded to UPE 220a.

In step 460, the local interface for the particular customer is determined. The particular customer is indicted by the L2VPN ID, which is SI0002. The local interface for SI0002 is the interface to CE 152a. UPE 220a strips out the Ethernet packet, and determines from the tunnel packet that the associated L2VPN ID is SI0002. This L2VPN ID is also associated with the interface to CE 152a.

In step 470, the Ethernet packet from CE 152b in the Ethernet packet portion 310 of the tunnel packet 311 is sent to the second customer over the local interface to CE 152a. The CE 152a places the Ethernet packet on LAN 142a where it is processed by every end node on the LAN 142a.

In step 480, the remote PE for the particular customer is learned, if not known already. In the example, the customer with ID SI0002 is learned to be associated with the remote NPE node label P500002 (node 221b).

In step 490, the packet source is associated with the remote PE. It is assumed for purposes of illustration that an end node with MAC address MAC 142B01 on LAN 142b generated the broadcast Ethernet packet forwarded by CE 152b. Thus, in step 490, UPE node 220a learns that MAC142B01 is associated with remote source label P500002 (NPE node 221b).

Control then passes back to step 420 to receive the next local Ethernet packet and ultimately to step 450 to receive the next tunnel packet from the SP network.

In the second example embodiment, an MPLS tunnel is used at NPE nodes with tunnel packet 321 based on the MAC-in-MAC Ethernet frame and omitting application label 323. In step 402 B-MAC data is received for all PE nodes. For purposes of illustration, it is assumed that the SP network is SP network 210 and that the B-MAC labels received are as listed in Table 3. Because these labels are distributed using LDP, every LSR and PE in SP network 210 is aware of these labels and associated IP addresses

TABLE 3

Example labels for PE node interfaces in an MPLS network.

| Node | IP address | B-MAC LABEL |
|---|---|---|
| 220a interface to CE 151a | 123.45.67.90 | BMAC000A1 |
| 220a interface to CE 152a | 123.45.67.90 | BMAC000A2 |
| 220a interface to CE 153a | 123.45.67.90 | BMAC000A3 |
| 221b interface to CE 151b | 123.45.76.99 | BMAC000B1 |
| 221b interface to CE 152b | 123.45.76.99 | BMAC000B2 |
| 221b interface to CE 153b | 123.45.76.99 | BMAC000B3 |
| 221c interface to CE 151c | 123.45.12.35 | BMAC000C1 |
| 221c interface to CE 152c | 123.45.12.35 | BMAC000C2 |
| 221c interface to CE 153c | 123.45.12.35 | BMAC000C3 |

In step 404, the labels are received for all customers at the local PE node. For example, customer IDs for all the customers at UPE 210a are received. For purposes of illustration, it is assumed that the UPE node 220a is configured so that the attachment circuit to CE node 151a is associated with customer ID="C0001," the attachment circuit to CE node 152a is associated with customer ID="C0002," the attachment circuit to CE node 153a is associated with customer ID="C0003," to indicate the first customer, the second customer and the third customer, respectively.

In step 410, one multicast MPLS tunnel is established to each remote PE for VPLS traffic. For example, multicast tunnel 232 is formed among NPE 221a, 221b, 221c, as shown in FIG. 2.

Customer ID reach ability is learned, so step 414, is omitted.

In step 420, a local layer 2 packet is received from one customer. For example, an Ethernet packet 310 is received from LAN 142b through CE node 152b at a particular interface on UPE 220b with B-MAC label BMAC000B2. The configuration data at UPE 220b indicates that this data packet has customer ID=C0002. At first, no node on LAN 142b knows any MAC addresses on LAN 142a or 142c. So the Ethernet packet 310 is forwarded from UPE 220b if it has a broadcast MAC destination address.

In step 422, it is determined whether the destination of the layer 2 packet is known to be associated with a particular remote PE. The broadcast MAC destination address is not associated with a particular remote PE, so control passes to step 424. In step 424, every remote PE is determined, so the multicast group is the destination for the tunneled data packet.

In step 430, a tunnel packet is generated for all of these remote PE nodes. The MPLS label is followed by a MAC-in-MAC outer header. For example, the multicast tunnel packet 331 with values in Table 4 is generated by UPE 220b.

TABLE 4

Example tunnel packet for Ethernet packet from LAN 142a.

| Field | First packet |
|---|---|
| MPLS Path Label | multicast group |
| First 4 bits | oxC |
| Destination PE MAC adrs | multicast |
| Source PE MAC adrs | BMAC000B2 |
| Ethernet packet | From CE 152b |

In step 440, the generated multicast MPLS tunnel packet is sent over the SP network 210. For example, the tunnel packet listed in Table 4 is forwarded from UPE 220a to NPE 221a. The MPLS Path label is switched rapidly by LSRs in SP network 210 and replaced at each hop. An advantage of this embodiment is that this routing is done with standard short (20 bit) lookups per label. The B-MAC addresses are learned only at the PEs, not at the LSRs within SP network 210.

To illustrate steps 450 through 490, it is assumed that the packet listed in Table 4 is received at NPE 221a after traversing SP network 210 through tunnel 232. In step 450, the packet listed in Table 4 is received at NPE 221a.

In step 460, the local interface for the particular customer is determined. The first four bits indicate that this is an Ethernet packet in an MPLS payload and not an IP packet or OAM packet. The particular customer is indicted by the source PE MAC address, which is BMAC000B2. This MAC address is associated with customer B, the second customer, based on the information received in Table 3 that BMAC000B2 is associated with 221b interface to CE 152b. The second customer is locally associated with PE MAC address BMAC000A2. The MPLS payload is stripped and the MAC-in-MAC frame is sent to UPE 220a to reach BMAC000A2, the interface on the UPE 220a connected to CE 152a for the second customer. UPE 220a strips out the Ethernet packet of CE 152b from the outer MAC-in-MAC header.

In step 470, the Ethernet packet of CE 152b in the Ethernet packet portion 310 of the tunnel packet 311 is sent to the second customer over the local interface to CE 152a. The CE 152a places the Ethernet packet on LAN 142a where it is processed by every end node on the LAN 142a.

In step 480, the remote PE for the particular customer is learned, if not known already. In the example, the customer with ID C0002 is also associated with the remote interface BMAC000B2 by virtue of the exchange during step 404 that builds Table 3.

In step 490, the packet source is associated with the remote PE. It is assumed for purposes of illustration that an end node with MAC address MAC 142B01 on LAN 142b generated the broadcast Ethernet packet forwarded by CE 152b. Thus, in step 490, UPE node 220a learns that MAC142B01 is associated with remote source BMAC000B2. Return traffic for MAC 142B01 will be labeled with BMAC000B in the destination PE MAC address field 324, and will be sent in a unicast tunnel rather than a multicast tunnel.

Control then passes back to step 420 to receive the next local Ethernet packet and ultimately to step 450 to receive the next tunnel packet from the SP network.

4.0 Implementation Mechanisms—Hardware Overview

Figure 5:
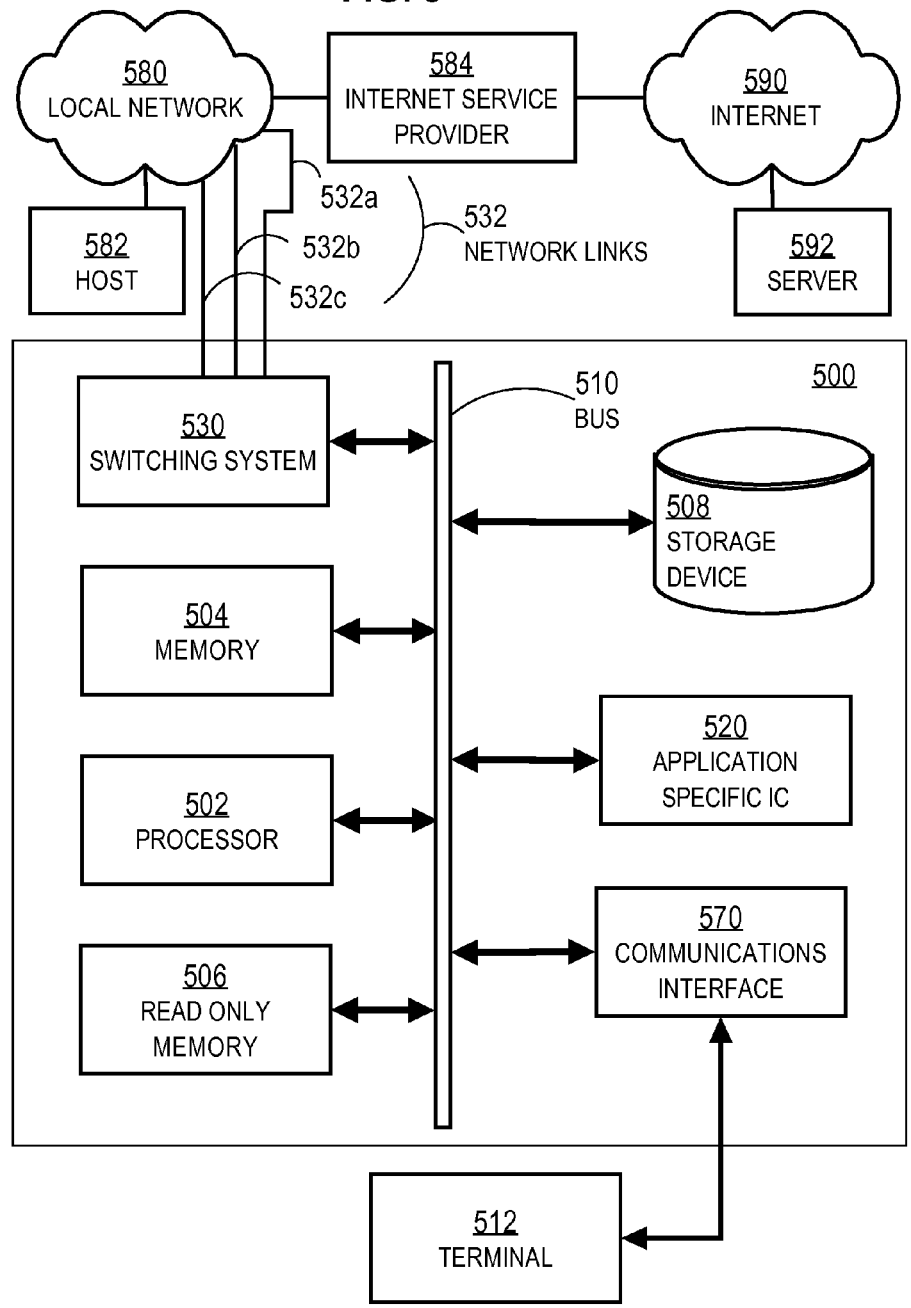
FIG. 5 illustrates a computer system upon which an embodiment of the invention may be implemented.

FIG. 5 illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, carry information to and from computer system 500. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532*b* through communications interface in switching system 530. The received code may be executed by processor 502 or switching system 530 as it is received, or may be stored in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 532*b*. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving, at a local provider edge node in a provider network, a data link layer packet from a first customer edge node of a plurality of customer edge nodes connected to the local provider edge node;
generating a tunnel data packet for a particular tunneling protocol, wherein the tunnel data packet includes tunnel data that indicates tunnel termination at a different provider edge node in the provider network, customer identifier data that uniquely indicates a customer associated with the first customer edge node, and the data link layer packet;
sending the tunnel data packet over the provider network;
receiving at the local provider edge node an incoming tunnel data packet that includes incoming tunnel data that indicates a tunnel with a sending provider edge node different from the local provider edge node, incoming customer data that uniquely identifies a sending customer, and an incoming data link layer data packet determining a second customer edge node of the plurality of customer edge nodes based on the incoming customer data and sending the incoming data link layer data packet to the second customer edge node.

2. A method as recited in claim 1, said step of generating the tunnel data packet further comprising generating the tunnel data packet using a tunneling protocol native to the provider network.

3. A method as recited in claim 2, said step of generating the tunnel data packet using a tunneling protocol native to the provider network further comprising generating the tunnel data packet using a multi-protocol label switching (MPLS) labeled path to the different provider edge node.

4. A method as recited in claim 1, further comprising establishing a multipoint tunnel among a plurality of different provider edge nodes in the provider network.

5. A method as recited in claim 1, said step of generating the tunnel data packet further comprising generating a tunnel data packet that includes a source media access control (MAC) identifier that is uniquely associated with a user facing provider edge node different from a network facing provider edge node at the local provider edge node.

6. A method as recited in claim 1, said step of generating the tunnel data packet further comprising generating a tunnel data packet that includes customer identifier data that includes a source media access control (MAC) identifier that is uniquely associated with the first customer edge node.

7. A method as recited in claim 6, wherein:
said step of receiving a data link layer packet from the first customer edge node further comprises receiving an Ethernet packet from the first customer edge node; and
said step of generating the tunnel data packet further comprises generating a tunnel data packet that includes an outer Ethernet header followed by an inner Ethernet header, wherein the outer Ethernet header includes the source MAC identifier that is uniquely associated with the first customer edge node and the inner Ethernet header is an Ethernet header from the Ethernet packet received from the first customer edge node.

8. A method as recited in claim 7, said step of generating the tunnel data packet further comprising generating the tunnel data packet using a multi-protocol label switching (MPLS) labeled path to the different provider edge node, wherein the tunnel data packet includes an application MPLS label that indicates the encapsulated data includes an outer Ethernet header followed by an inner Ethernet header.

9. A method as recited in claim 6, said step of generating the tunnel data packet further comprising:
generating a tunnel data packet that includes customer identifier data that includes a destination MAC identifier that is uniquely associated with a destination customer edge node among a plurality of customer edge nodes connected to the different provider edge node,
wherein the destination customer edge node and the first customer edge node are associated with one particular customer of a plurality of customers.

10. A method as recited in claim 9, wherein:
said step of receiving a data link layer packet from the first customer edge node further comprises receiving an Ethernet packet from the first customer edge node; and
said step of generating the tunnel data packet further comprises generating a tunnel data packet that includes an outer Ethernet header followed by an inner Ethernet header, wherein the inner Ethernet header is an Ethernet header from the Ethernet packet received from the first customer edge node and the outer Ethernet header includes the source MAC identifier that is uniquely associated with the first customer edge node and the destination MAC identifier that is uniquely associated with a destination customer edge node.

11. A method as recited in claim 1, said step of generating the tunnel data packet further comprising generating a tunnel data packet that includes:
a source identifier for the local provider edge node; and
a destination identifier for the different provider edge node.

12. A method as recited in claim 11, said step of generating the tunnel data packet further comprising generating a tunnel data packet for a multi-protocol label switching (MPLS) protocol that includes:
the tunnel data that is included in a MPLS path label;
the source identifier that is indicated by an MPLS label that is associated with the local provider edge node; and
the destination identifier that is indicated by an MPLS label that is associated with the different provider edge node.

13. A method as recited in claim 1, said step of receiving a data link layer packet from the first customer edge node further comprising receiving an Ethernet packet from the first customer edge node.

14. An apparatus comprising:
means for receiving a data link layer packet from a first customer edge node of a plurality of customer edge nodes connected directly to the apparatus;
means for generating a tunnel data packet for a particular tunneling protocol, wherein the tunnel data packet includes tunnel data that indicates tunnel termination at a remote provider edge node on a provider network, customer identifier data that uniquely indicates a customer associated with the first customer edge node, and the data link layer packet;
means for sending the tunnel data packet over the provider network; means for receiving at the local provider edge node an incoming tunnel data packet that includes incoming tunnel data that indicates a tunnel with a sending provider edge node different from the local provider edge node, incoming customer data that uniquely identifies a sending customer, and an incoming data link layer data packet; means for determining a second customer edge node of the plurality of customer edge nodes based on the incoming customer data and means for sending the incoming data link layer data packet to the second customer edge node.

15. An apparatus comprising:
a provider network interface that is configured for communicating a data packet with a packet-switched provider network;
a plurality of customer network interfaces that are each configured for communicating a data packet with a different customer edge node of a plurality of customer edge nodes;
logic encoded in one or more tangible media for execution and, when executed, operable for:
receiving a data link layer packet through a first customer network interface of the plurality of customer network interfaces from a first customer edge node of the plurality of customer edge nodes;
generating a tunnel data packet for a particular tunneling protocol, wherein the tunnel data packet includes tunnel data that indicates tunnel termination at a provider edge node in the provider network different from the apparatus, customer identifier data that uniquely indicates a customer associated with the first customer edge node, and the data link layer packet;
sending the tunnel data packet through the provider network interface;
receiving through the provider network interface an incoming tunnel data packet that includes incoming tunnel data that indicates a tunnel with a sending provider edge node different from the local provider edge node, incoming customer data that uniquely identifies a sending customer, and an incoming data link layer data packet;
determining, based on the incoming customer data, a second customer network interface of the plurality of customer network interfaces, wherein the second customer network interface is connected to a second customer edge node associated with the second customer; and
sending the incoming data link layer data packet through the second customer network interface.

16. An apparatus as recited in claim 15, said generating the tunnel data packet further comprising generating the tunnel data packet using a tunneling protocol native to the provider network.

17. An apparatus as recited in claim 16, said generating the tunnel data packet using a tunneling protocol native to the provider network further comprising generating the tunnel data packet using a multi-protocol label switching (MPLS) labelled path to the different provider edge node.

18. An apparatus as recited in claim 15, wherein the logic, when executed, is further operable for establishing a multi-point tunnel among a plurality of different provider edge nodes in the provider network.

19. An apparatus as recited in claim 15, said generating the tunnel data packet further comprising generating a tunnel data packet that includes a source media access control (MAC) identifier that is uniquely associated with a user facing provider edge node different from the apparatus.

20. An apparatus as recited in claim 15, said generating the tunnel data packet further comprising generating a tunnel data packet that includes customer identifier data that includes a source media access control (MAC) identifier that is uniquely associated with the first customer edge node.

21. An apparatus as recited in claim 20, wherein:
said receiving a data link layer packet from the first customer edge node further comprises receiving an Ethernet packet from the first customer edge node; and
said generating the tunnel data packet further comprises generating a tunnel data packet that includes an outer Ethernet header followed by an inner Ethernet header, wherein the outer Ethernet header includes the source MAC identifier that is uniquely associated with the first customer edge node and the inner Ethernet header is an Ethernet header from the Ethernet packet received from the first customer edge node.

22. An apparatus as recited in claim 21, said generating the tunnel data packet further comprising generating the tunnel data packet using a multi-protocol label switching (MPLS) labelled path to the different provider edge node, wherein the tunnel data packet includes an application MPLS label that indicates the encapsulated data includes an outer Ethernet header followed by an inner Ethernet header.

23. An apparatus as recited in claim 20, said generating the tunnel data packet further comprising:
generating a tunnel data packet that includes customer identifier data that includes a destination MAC identifier that is uniquely associated with a destination customer edge node among a plurality of customer edge nodes connected to the different provider edge node,
wherein the destination customer edge node and the first customer edge node are associated with one particular customer of a plurality of customers.

24. An apparatus as recited in claim 23, wherein:
said receiving a data link layer packet from the first customer edge node further comprises receiving an Ethernet packet from the first customer edge node; and
said generating the tunnel data packet further comprises generating a tunnel data packet that includes an outer Ethernet header followed by an inner Ethernet header, wherein the inner Ethernet header is an Ethernet header from the Ethernet packet received from the first customer edge node and the outer Ethernet header includes the source MAC identifier that is uniquely associated with the first customer edge node and the destination MAC identifier that is uniquely associated with a destination customer edge node.

25. An apparatus as recited in claim 15, said generating the tunnel data packet further comprising generating a tunnel data packet that includes:
- a source identifier for the apparatus; and
- a destination identifier for the different provider edge node.

26. An apparatus as recited in claim 25, said generating the tunnel data packet further comprising generating a tunnel data packet for a multi-protocol label switching (MPLS) protocol that includes:
- the tunnel data that is included in a MPLS path label;
- the source identifier that is indicated by an MPLS label that is associated with the local provider edge node; and
- the destination identifier that is indicated by an MPLS label that is associated with the different provider edge node.

27. An apparatus as recited in claim 15, said receiving a data link layer packet from the first customer edge node further comprising receiving an Ethernet packet from the first customer edge node.

* * * * *